(12) United States Patent
Yasumura

(10) Patent No.: US 6,301,129 B1
(45) Date of Patent: Oct. 9, 2001

(54) SWITCHING POWER SUPPLY CIRCUIT

(75) Inventor: Masayuki Yasumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/667,123

(22) Filed: Sep. 21, 2000

(30) Foreign Application Priority Data

Sep. 22, 1999 (JP) ................................. 11-268433

(51) Int. Cl.$^7$ .................................. H02M 3/335
(52) U.S. Cl. ....................... 363/21.03; 323/207
(58) Field of Search ............. 363/21.01, 21.02, 363/21.03; 323/207, 908

(56) References Cited

U.S. PATENT DOCUMENTS

| | | | |
|---|---|---|---|
| 5,586,016 | * 12/1996 | Konopka et al. ................. | 363/21.01 |
| 5,740,022 | * 4/1998 | Abe ................................. | 363/21.01 |
| 6,069,801 | * 5/2000 | Hodge, Jr. et al. ............... | 363/21.02 |

FOREIGN PATENT DOCUMENTS 0 704 958 A1   4/1996   (EP) .
WO 99 16163    4/1999   (WO) .

OTHER PUBLICATIONS

Patent Abstracts of Japan vol. 1998, No. 13, Nov. 30, 1998 (1998–11–30) & JP 10 215580 A (Matsushita Electric Works Ltd), Aug. 11, 1998 (1998–08–11).

Unseld A et al: "Simple Pump Circuit with Sine Choke for SMPS" Components, DE,Siemens Aktiengesellschaft. Munchen, vol. 33, No. 1, Feb. 1, 1998 (1998–02–01), pp. 26–28, XP000780590 ISSN: 0945–1137.

* cited by examiner

*Primary Examiner*—Shawn Riley
(74) *Attorney, Agent, or Firm*—Frommer Lawrence & Haug LLP.; William S. Frommer

(57) ABSTRACT

A switching power supply circuit is disclosed which maintains a power factor which can satisfy actual use conditions against a variation in load or ac input voltage. The switching power supply circuit includes a power factor improvement circuit for a composite resonance converter and is constructed such that a switching output obtained by voltage division by a primary side resonance capacitor formed from a series connection of first and second capacitors is fed back to the power factor improvement circuit.

4 Claims, 11 Drawing Sheets

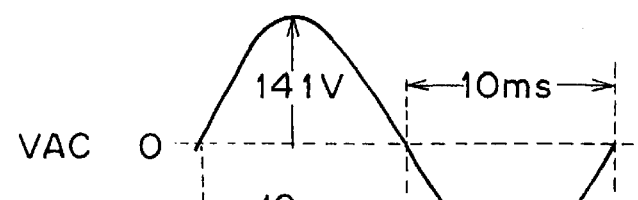
FIG. 4A  VAC
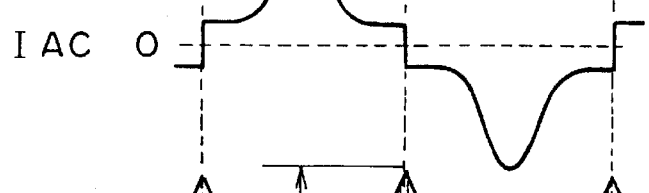
FIG. 4B  IAC
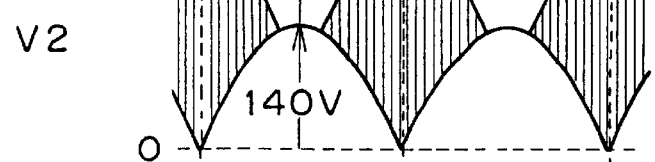
FIG. 4C  V2
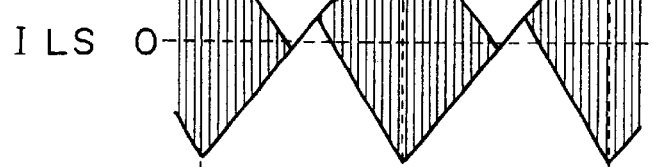
FIG. 4D  ILS
FIG. 4E  I2
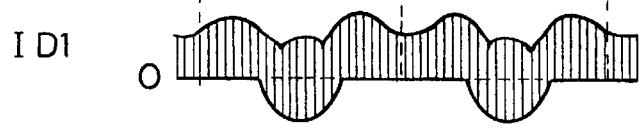
FIG. 4F  ID1

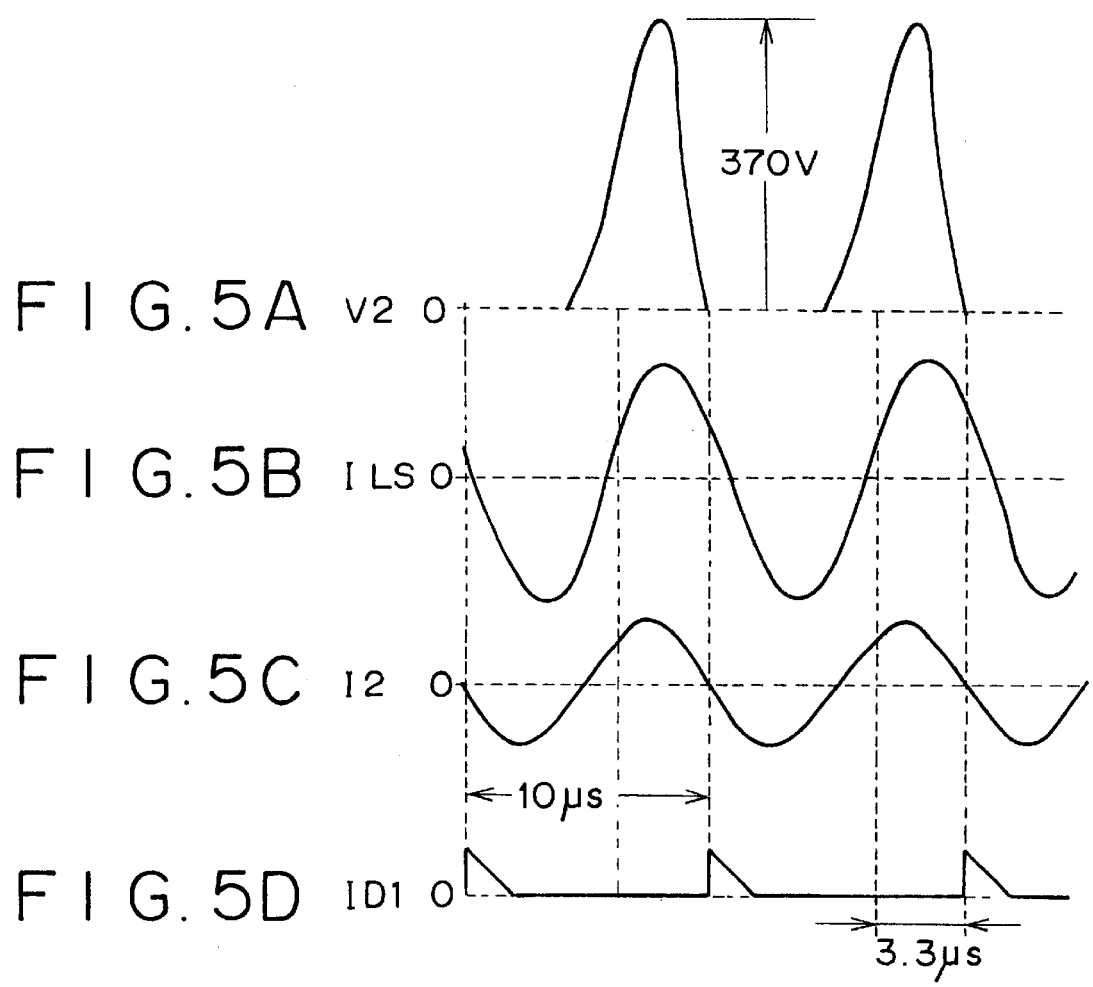

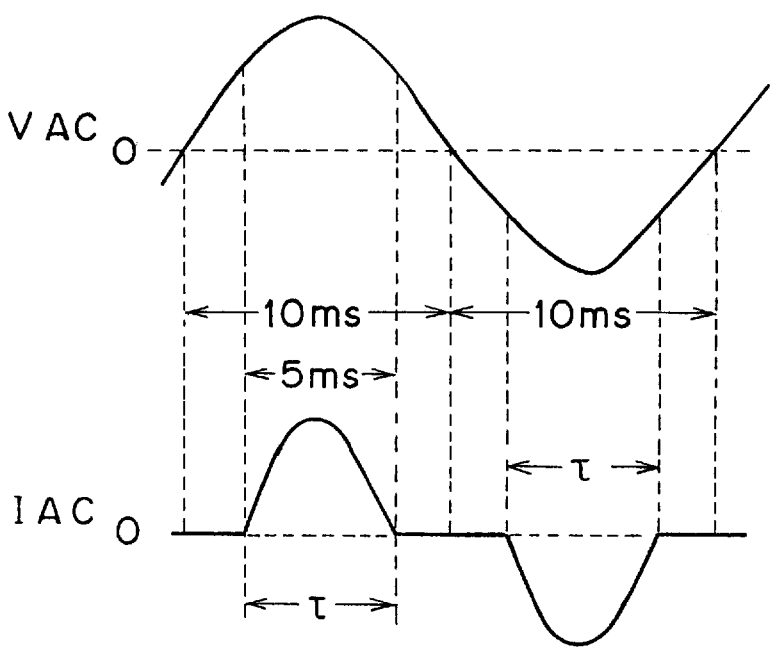
F I G. 14A $V_{AC}$
F I G. 14B $I_{AC}$
Po max = 120W, VAC = 100V
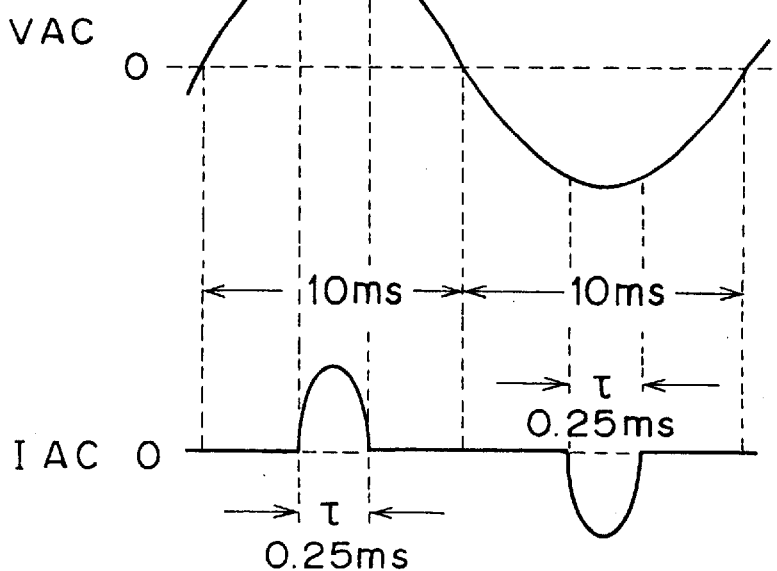
F I G. 14C $V_{AC}$
F I G. 14D $I_{AC}$
Po min = 40W, VAC = 100V

SWITCHING POWER SUPPLY CIRCUIT

BACKGROUND OF THE INVENTION

This invention relates to a switching power supply circuit which includes a power factor improvement circuit.

The applicant of the present invention has proposed various power supply circuits which include a resonance type converter on the primary side. Also various power supply circuits wherein a power factor improvement circuit for improving the power factor is provided for a resonance type converter have been proposed by the applicant of the present invention.

FIG. 10 is a circuit diagram showing an example of a switching power supply circuit constructed in accordance with the invention having been applied for patent by the present applicant. The power supply circuit is constructed such that a power factor improvement circuit for improving the power factor is provided for a self-excited current resonance type switching converter.

The power supply circuit shown in FIG. 10 includes a bridge rectification circuit Di for full wave rectifying a commercial ac power supply AC. In this instance, a rectification output obtained by rectification by the bridge rectification circuit Di is charged into a smoothing capacitor Ci through a power factor improvement circuit 20, and a rectified smoothed voltage Ei corresponding to the level equal to the ac input voltage VAC is obtained across the smoothing capacitor Ci.

An inrush current limiting resistor Ri is inserted in the rectification current path of the rectification smoothing circuit (Di, Ci) so that inrush current to flow into the smoothing capacitor, for example, when supply of power is started, may be suppressed.

In the power factor improvement circuit 20 shown in FIG. 10, a filter choke coil LN—high speed recovery type diode D1—choke coil LS connected in series are inserted between a positive output terminal of the bridge rectification circuit Di and a positive terminal of the smoothing capacitor Ci.

A filter capacitor CN is interposed between the anode side of the high speed recovery type diode D1 and the positive terminal of the smoothing capacitor Ci to form a low-pass filter of a normal mode together with the filter choke coil LN.

In the power factor improvement circuit 20, a terminal of a primary side series resonance circuit which is hereinafter described is connected to a connection point between the cathode of the high speed recovery type diode D1 and the choke coil LS so that a switching output obtained by the dc resonance circuit may be fed back.

It is to be noted that a power factor improvement operation of the power factor improvement circuit 20 is hereinafter described.

The power supply circuit includes a self-excited current resonance type converter which uses the rectified smoothed voltage Ei which is a voltage across the smoothing capacitor Ci as operating current.

The current resonance type switching converter includes a pair of switching elements Q1 and Q2 formed from bipolar transistors, connected in a half bridge connection as seen in FIG. 10 and interposed between the positive electrode side connection point of the smoothing capacitor Ci and the ground.

Starting resistors RS1 and RS2 are interposed between the collector and the base of the switching elements Q1 and Q2, respectively. A pair of resistors RB1 and RB2 connected to the base of the switching elements Q1 and Q2 set base current (drive current) of the switching elements Q1 and Q2. A pair of clamp diodes DD1 and DD2 are interposed between the base and the emitter of the switching elements Q1 and Q2, respectively. The clamp diodes DD1 and DD2 form current paths for clamp current which flows between the base and the emitter of the switching elements Q1 and Q2 within periods within which the switching elements Q1 and Q2 are off.

A pair of resonance capacitors CB1 and CB2 form series resonance circuits for self-excited oscillation (self-excited oscillation driving circuits) together with drive windings NB1 and NB2 of a drive transformer PRT (Power Regulating Transformer), which are described subsequently, and determine switching frequencies of the switching elements Q1 and Q2.

The drive transformer PRT is provided to drive the switching elements Q1 and Q2 and variably control the switching frequencies to perform constant voltage control. The drive transformer PRT shown in FIG. 10 is formed as an orthogonal saturable reactor on which the drive windings NB1 and NB2 and a resonance current detection wiring ND are wound and a control winding NC is wound in a direction orthogonal to the windings.

An end of the drive winding NB1 of the drive transformer PRT is connected to the base of the switching element Q1 through a series connection of the resistor RB1 and the resonance capacitor CB1, and the other end of the drive winding NB1 is connected to the emitter of the switching element Q1. An end of the drive winding NB2 is connected to the ground, and the other end of the drive winding NB2 is connected to the base of the switching element Q2 through a series connection of the resistor RB2 and the resonance capacitor CB2. The drive winding NB1 and the drive winding NB2 are wound such that they may generate voltages having the polarities opposite to each other.

An insulation converter transformer PIT (Power Isolation Transformer) transmits switching outputs of the switching elements Q1 and Q2 to the secondary side. An end of the primary winding N1 of the insulation converter transformer PIT is connected to a connection point (switching output point) between the emitter of the switching element Q1 and the collector of the switching element Q2 through the resonance current detection wiring ND so that a switching output may be obtained.

The other end of the primary winding N1 is connected to a connection point between the cathode of the high speed recovery type diode D1 in the power factor improvement circuit 20 and the choke coil LS through a series resonance capacitor C1.

In this instance, the series resonance capacitor C1 and the primary winding N1 are connected in series. Thus, a primary side series resonance circuit for making operation of the switching converter operation of the current resonance type is formed from a capacitance of the series resonance capacitor C1 and a leakage inductance component of the insulating converter transformer PIT including the primary winding N1 (series resonance winding).

On the secondary side of the insulating converter transformer PIT shown in FIG. 10, a center tap is provided for the secondary winding N2, and rectification diodes D01, D02, D03 and D04 and smoothing capacitors C01 and C02 are connected in such a manner as seen in FIG. 10. By the connection, two sets of full wave rectification circuits including a set of the [rectification diodes D01 and D02 and smoothing capacitor C01] and another set of the

[rectification diodes D03 and D04 and smoothing capacitor C02] are provided. The full-wave rectification circuit formed from the [rectification diodes D01 and D02 and smoothing capacitor C01] produces a dc output voltage E01, and the full-wave rectification circuit formed from the [rectification diodes D03 and D04 and smoothing capacitor C02] produces another dc output voltage E02.

It is to be noted that, in this instance, the dc output voltage E01 and the dc output voltage E02 are branched and inputted also to a control circuit 1. The control circuit 1 utilizes the dc output voltage E01 as a detection voltage and utilizes the dc output voltage E02 as an operation power supply to the control circuit 1.

The control circuit 1 supplies dc current whose level is varied, for example, in response to the level of the dc output voltage E01 on the secondary side as control current to the control winding NC of the drive transformer PRT to perform constant voltage control in such a manner as hereinafter described.

In a switching operation of the power supply circuit having the construction described above, when a commercial ac power supply is made available first, for example, starting current is supplied to the bases of the switching elements Q1 and Q2 through the starting resistors RS1 and RS2, respectively. The switching elements Q1 and Q2 are controlled so that, for example, if the switching element Q1 is switched on first, then the switching element Q2 is controlled so that it is switched off. Then, as an output of the switching element Q1, resonance current flows through the resonance current detection winding ND→primary winding N1→series resonance capacitor C1. The switching elements Q1 and Q2 are controlled so that, around a time at which the resonance current decreases to zero, the switching element Q2 is switched on and the switching element Q1 is switched off. Then, resonance current flows in the reverse direction to that described above through the switching element Q2. Thereafter, a self-excited switching operation wherein the switching elements Q1 and Q2 are alternately switched on is performed.

As the switching elements Q1 and Q2 alternately repeat on-off operations using the terminal voltage of the smoothing capacitor Ci as an operating power supply in this manner, drive current having a waveform proximate to a resonance current waveform is supplied to the primary winding N1 of the insulating converter transformer PIT while an alternating output is obtained at the secondary winding N2.

The constant voltage control by the drive transformer PRT is performed in the following manner.

For example, if the secondary side dc output voltage E01 varies into a rising direction in response to the ac input voltage level, a load variation or the like, then also the level of the control current to flow through the control winding NC is controlled so as to increase in response to the rise of the secondary side dc output voltage E01 as described hereinabove.

While the drive transformer PRT is inclined to approach a saturation condition by an influence of magnetic flux generated in the drive transformer PRT and this acts to drop the inductance of the drive windings NB1 and NB2, the condition of the self-excited oscillation circuit is varied so that the switching frequency may be raised.

While the switching frequency in the power supply circuit is set in a frequency region higher than the resonance frequency of the series resonance circuit of the series resonance capacitor C1 and the primary winding N1 (upper side control), if the switching frequency rises as described above, then the switching frequency is spaced away from the resonance frequency of the series resonance circuit. Consequently, the resonance impedance of the series resonance circuit with respect to the switching output increases.

Since the resonance.impedance increases in this manner and this suppresses the drive current to be supplied to the primary winding N1 of the primary side series resonance circuit, the secondary side output voltage is suppressed, thereby achieving constant voltage control.

It is to be noted that the constant voltage control system by such a method as described above is hereinafter referred to as "switching frequency control system".

The power factor improvement operation by the power factor improvement circuit 20 is such as follows.

In the construction of the power factor improvement circuit 20 shown in FIG. 10, the switching output supplied to the series resonance circuit (N1, C1) is fed back to the rectified current path through an inductive reactance (magnetic coupling) which the choke coil LS itself has.

With the switching output fed back in such a manner as described above, an alternating voltage of the switching period is superposed on the rectified current path. By the superposed component of the alternating voltage of the switching period, an operation of interrupting the rectified current in the switching period is obtained at the high speed recovery type diode D1. By the interruption operation, however, also the apparent inductance of the filter choke coil LN and the choke coil LS increases. Consequently, charging current to the smoothing capacitor Ci flows also within a period within which the rectified output voltage level is lower than the voltage across the smoothing capacitor Ci.

As a result, an average waveform of the ac input current approaches the waveform of the ac input voltage to increase the continuity angle of the ac input current, and consequently, improvement of the power factor is achieved.

FIG. 11 is a circuit diagram showing another construction example of a switching power supply circuit which can be constructed based on the invention proposed formerly by the applicant of the present application. Also the present power supply circuit includes a current resonance type converter wherein two switching elements are connected in a half bridge connection. However, the driving system for the power supply circuit is a separate excitation system. Also in this instance, the power supply circuit includes a power factor improvement circuit for achieving power factor improvement.

It is to be noted that like reference characters are applied to like elements to those of FIG. 10 and description thereof is omitted.

The primary side current resonance type converter shown in FIG. 11 includes two switching elements Q11 and Q12 which are, for example, MOS-FETs.

The drain of the switching element Q11 is connected to a line of a rectified smoothed voltage Ei and the source of the switching element Q11 and the drain of the switching element Q12 are connected to each other while the source of the switching element Q12 is connected to the primary side ground thereby to obtain a half bridge connection of the separate excitation type.

The switching elements Q11 and Q12 are driven for switching by an oscillation drive circuit 2 so that on/off operations thereof may be repeated alternately to interrupt the rectified smoothed voltage Ei to obtain a switching output.

In this instance, clamp diodes DD1 and DD2 connected in such directions as indicated in FIG. 11 are provided between the drain and the source of the switching elements Q11 and Q12.

In this instance, an end of a primary winding N1 of an insulation converter transformer PIT is connected to a connection point (switching output point) between the source and the drain of the switching elements Q11 and Q12 so that the switching output may be supplied to the primary winding N1. The other end of the primary winding N1 is connected through a series resonance capacitor C1 to a connection point between a filter choke coil LN of a power factor improvement circuit 21, which is described below, and the anode of a high speed recovery type diode D1.

Also in this instance, a series resonance circuit for making the switching power supply circuit a circuit of the current resonance type is formed from the capacitance of the series resonance capacitor C1 and a leakage inductance component of the insulation converter transformer PIT including the primary winding N1.

A control circuit 1 in this instance outputs, for example, a control signal of a level corresponding to a variation of a dc output voltage E01 to the oscillation drive circuit 2. The oscillation drive circuit 2 varies, based on the control signal supplied thereto from the control circuit 1, the frequencies of the switching driving signals to be supplied from the oscillation drive circuit 2 to the gates of the switching elements Q11 and Q12 to vary the switching frequency.

Also in the power supply circuit shown in FIG. 11, similarly as in the power supply circuit shown in FIG. 10, the switching frequency is set within a region higher than the series resonance frequency. Then, for example, if the dc output voltage E01 rises, then the control circuit 1 controls the oscillation drive circuit 2 so that the switching frequency may be raised in response to the level of the dc output voltage E01. Consequently, constant voltage control is performed in a similar manner as that described with reference to FIG. 10.

A starting circuit 3 is provided to detect a voltage or current obtained at the rectification smoothing line immediately after the power supply is made available to activate the oscillation drive circuit 2. The starting circuit 3 receives, as an operation power supply, a dc voltage of a low level obtained by rectifying a winding wound additionally on the insulation converter transformer PIT.

In the power factor improvement circuit 21 shown in FIG. 11, a filter choke coil LN and a high speed recovery type diode D1 connected in series are interposed between the positive output terminal of the bridge rectification circuit Di and the positive terminal of the smoothing capacitor Ci. Here, the filter capacitor CN is provided in parallel to the series connection circuit of the filter choke coil LN and the high speed recovery type diode D1. Also in such a connection form as just described, the filter capacitor CN forms a low-pass filter of a normal mode together with the filter choke coil LN.

A resonance capacitor C3 is provided in parallel to the high speed recovery type diode D1. Although detailed description is omitted here, for example, the resonance capacitor C3 forms a parallel resonance circuit, for example, together with the filter choke coil LN and so forth, and the resonance frequency of the parallel resonance circuit is set so as to be substantially equal to the resonance frequency of a series resonance circuit which is hereinafter described. Consequently, an action of suppressing a rise of the rectified smoothed voltage Ei when the load decreases is provided.

In the power factor improvement circuit 21, an end portion of a series resonance circuit (N1, C1) is connected to a connection point between the filter choke coil LN and the anode of the high speed recovery type diode D1 as described hereinabove.

In such a connection scheme as described above, a switching output obtained at the primary winding N1 is fed back to the rectified current path through an electrostatic capacitance coupling of the series resonance capacitor C1. In this instance, resonance current obtained at the primary winding N1 is fed back so that it flows to the connection point between the filter choke coil LN and the anode of the high speed recovery type diode D1 so that the switching output may be applied.

Since the switching output is fed back in such a manner as described above, the alternating voltage of the switching period is superposed on the rectified current path, and owing to the superposed alternating voltage of the switching period, an operation of interrupting the rectified current in the switching period is obtained at the high speed recovery type diode D1. Also the apparent inductance of the filter choke coil LN is raised by the interruption operation.

Further, since current of the switching period flows through the resonance capacitor C3, a voltage is generated across the resonance capacitor C3, and the level of the rectified smoothed voltage Ei is lowered by the voltage across the series resonance capacitor C1. Consequently, charging current to the smoothing capacitor Ci flows also within a period within which the rectified output voltage level is lower than the voltage across the smoothing capacitor Ci.

As a result, the average waveform of the ac input current approaches the waveform of the ac input voltage thereby to increase the continuity angle of the ac input current, and also in this instance, power factor improvement is achieved.

In this manner, the power supply circuits shown in FIGS. 10 and 11 can achieve power factor improvement due to the provision of a power factor improvement circuit (20, 21). Since each of the power factor improvement circuits shown in FIGS. 10 and 11 is formed from a small number of parts, they have a merit that power factor improvement can be achieved in a high efficiency, with low noise, with a reduced size and weight and at a low cost.

Here, a relationship between the load power Po and the power factor PF with regard to the power supply circuits shown in FIGS. 10 and 11 is illustrated in FIG. 12. It is to be noted here that a condition when the ac input voltage VAC=100 V is illustrated.

According to FIG. 12, it can be seen that a characteristic that the power factor PF decreases in response to decrease of the load power Po is obtained.

A relationship between the ac input voltage VAC and the power factor PF is illustrated in FIG. 13. Here, characteristics under the conditions of the maximum load power Pomax=120 W and the minimum load power Pomin=40 W are illustrated.

As shown in FIG. 13, it can be seen that the power factor PF decreases in proportion to a rise of the ac input voltage VAC.

The power factor PF under the condition of the minimum load power Pomin=40 W is lower than that under the condition of the maximum load power Pomax=120 W. In short, the characteristic that the power factor PF decreases as the load power decreases as described hereinabove in connection with FIG. 12 is obtained also here.

The characteristics illustrated in FIG. 13 are represented as operation waveform diagrams as seen in FIGS. 14A to 14D.

Here, the ac input voltage VAC and the ac input current IAC under the conditions of the ac input voltage VAC=100 V and the maximum load power Pomax=120 W are illustrated in FIGS. 14A and 14B, and the ac input voltage VAC and the ac input current IAC under the conditions of the ac input voltage VAC=100 V and the minimum load power Pomin=40 W are illustrated in FIGS. 14C and 14D.

Here, if it is assume that the half period of the ac input voltage VAC is 10 ms, then when the load power is the maximum load power Pomax=120 W. the continuity period τ of the ac input current IAC actually is approximately 5 ms and the power factor is PF=0.85. On the other hand, when the load power is the minimum load power Pomin=40 W, the continuity period τ of the ac input current IAC decreases to approximately 2.5 ms and the power factor drops to approximately PF=0.65. The value of the power factor PF obtained when the load power is the minimum load power Pomin=40 W does not sometimes satisfy a value of the load factor required for actual use.

Since the power factor is dropped by a variation of the ac input voltage or a variation of the load power in this manner, conversely speaking, the ac input voltage or the load condition to the power supply circuits are limited. In short, the power supply circuits have a problem in that apparatus which can adopt the power supply circuits are limited.

More particularly, although the power supply circuits can be adopted, for example, by a color television receiver for which the ac input voltage and the load condition are designated, they cannot be adopted by business apparatus or information apparatus.

Further, it is known that, with the constructions for power factor improvement shown in FIGS. 10 and 11, since they adopt the form that the series resonance circuit on the primary side is connected to the rectified current path of the commercial ac power supply, ripples of the commercial ac power supply period (50 Hz/60 Hz) are superposed on the series resonance circuit. The superposition level of such ripple components increases in proportion to increase of the load power.

It is known that, for example, if it is assumed that the power supply circuits are constructed using required parts selected so that a power factor of approximately PF=0.8 may be maintained under predetermined measurement conditions with which practical use can be provided, then compared with an alternative case wherein no power factor improvement circuit is provided, the ripple voltage level appearing with the secondary side dc output voltage when the load power is maximum increases to approximately 3 to 4 times.

To suppress such increase of ripple components as described above, for example, the power supply circuits shown in FIGS. 10 and 11 actually take such a countermeasure as augmentation of the gain of the control circuit 1 or increase of the capacitance of the smoothing capacitor Ci on the primary side. This, however, gives rise to problems that the cost of part elements increases and that the switching operation is liable to suffer from abnormal oscillation.

SUMMARY OF THE INVENTION

It is an object of the present invention to provide a switching power supply which maintains a power factor which can satisfy actual use conditions against a variation in load or ac input voltage.

To attain the object described above, according to the present invention, there is provided a switching power supply circuit, comprising rectification smoothing means for receiving a commercial ac power supply to produce a rectified smoothed voltage and outputting the rectified smoothed voltage as a dc input voltage, an insulation converter transformer having a gap formed therein so that a coupling coefficient of a loose coupling may be obtained and provided for transmitting a primary side output to a secondary side, switching means for interrupting the dc input voltage by means of a switching element and outputting the interrupted dc voltage to a primary winding of the insulation converter transformer, a primary side resonance circuit formed from a leakage inductance component at least including the primary winding of the insulation converter transformer and a capacitance of a primary side resonance capacitor for making operation of the switching means operation of the voltage resonance type, power factor improvement means inserted in a rectified current path for interrupting the rectified current based on a switching output of the switching means fed back to the power factor improvement means to improve the power factor, a secondary side resonance circuit formed on the secondary side from a leakage impedance component of a secondary winding of the insulation converter transformer and a capacitance of a secondary side resonance capacitor, dc output voltage production means formed including the secondary side resonance circuit for receiving an alternating voltage obtained at the secondary winding of the insulation converter transformer and rectifying the alternating voltage to produce a secondary side dc output voltage, and constant voltage control means for controlling the secondary side dc output voltage to a constant voltage in response to a level of the secondary side dc output voltage, the primary side resonance capacitor being formed from a series connection of first and second capacitors, the switching output of the switching means being fed back to the power factor improvement means through a connection point between the first and second capacitors.

In the switching power supply circuit, the switching output of a voltage divided by the primary side resonance capacitor formed from the series connection of the first and second capacitors is fed back to the power factor improvement circuit provided in the power supply circuit called composite resonance type converter.

Consequently, the switching power supply circuit is advantageous in that the power factor is maintained constant over a wide range against a variation of an ac input voltage or a load power. Consequently, the switching power supply circuit is suitable as a power factor improvement power supply circuit for business apparatus and information apparatus which are ready for a wide range for use for both of the ac input voltage AC of a 100 v type and a 200 V type or have a great load variation.

Further, since the switching power supply circuit exhibits a little increase (or little increase) of a ripple voltage component such as, for example, a 50 Hz ripple voltage component in the dc output voltage, no special countermeasure against ripples is required. Consequently, the switching power supply circuit is advantageous also in that augmentation of the gain of a control circuit, increase of the capacitance of an electrolytic capacitor or the like is unnecessary.

The switching power supply circuit is advantage further in that, since the dc input voltage rises when the load is heavy, the efficiency rises when compared with that before the power factor improvement, and since the operation waveforms of both of the voltage and the current become sine waves, generated noise has a low level.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 4A to 4F are waveform diagrams illustrating operation of the switching power supply circuit of FIG. 1;

FIGS. 5A to 5D are waveform diagrams illustrating operation of the switching power supply circuit of FIG. 1;

FIGS. 14A to 14D are waveform diagram illustrating different operation of the power supply circuits in response to an input of a commercial ac power supply in accordance with a load power.

DESCRIPTION OF THE PREFERRED EMBODIMENTS

Figure 1:
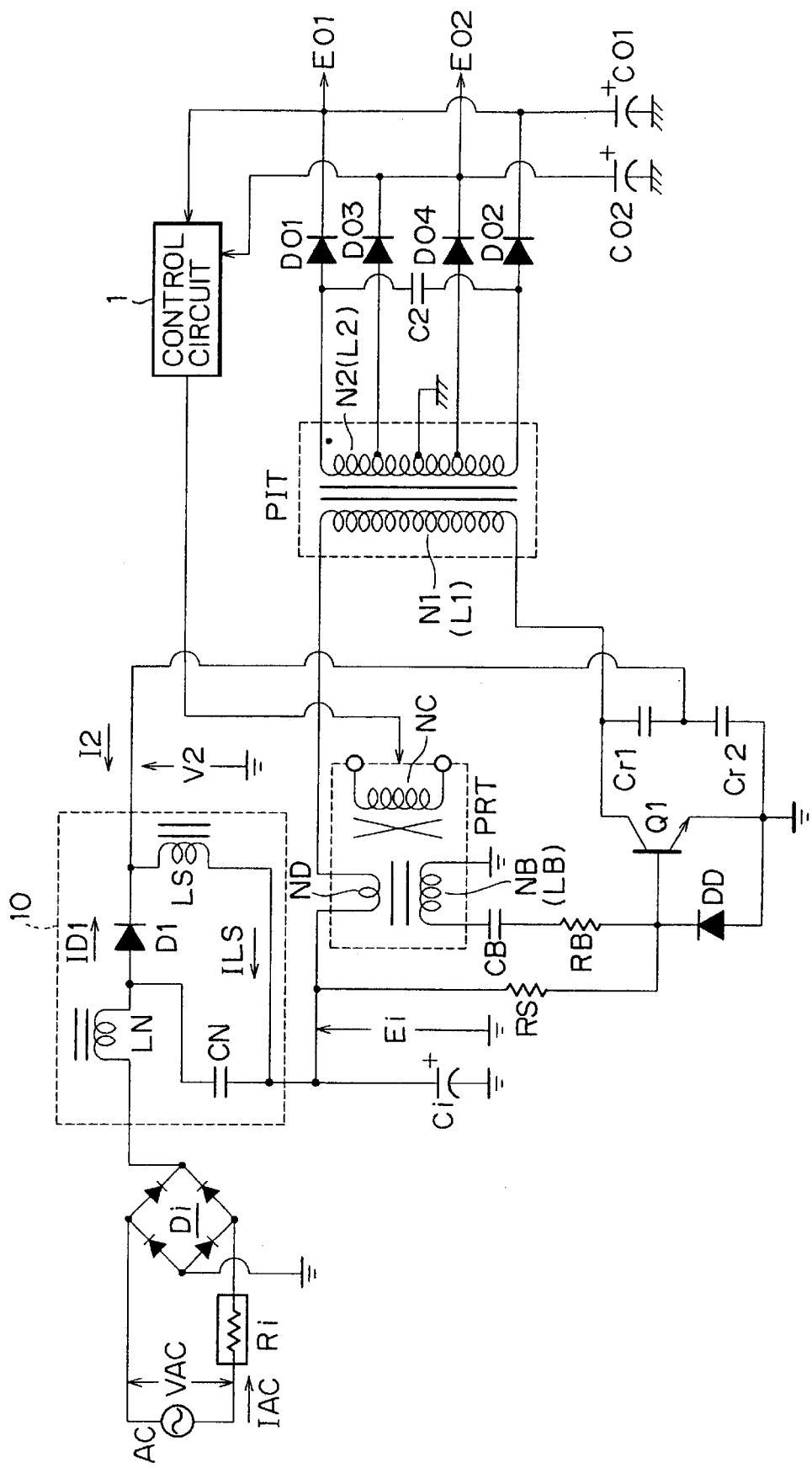
FIG. 1 is a circuit diagram showing a construction of a switching power supply circuit according to a first embodiment of the present invention.
Figure 10:
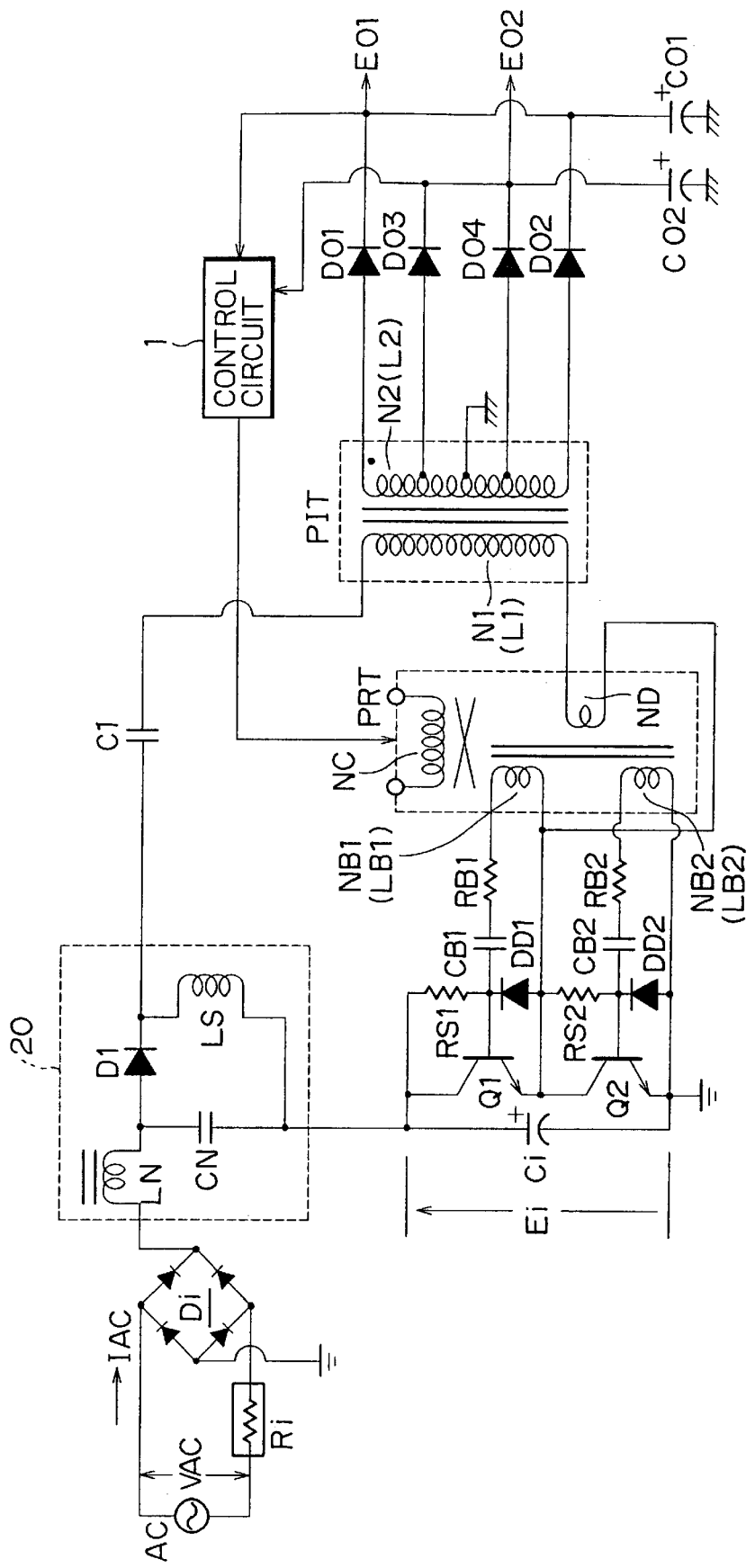
FIG. 10 is a circuit diagram showing a construction of a conventional power supply circuit.
Figure 11:
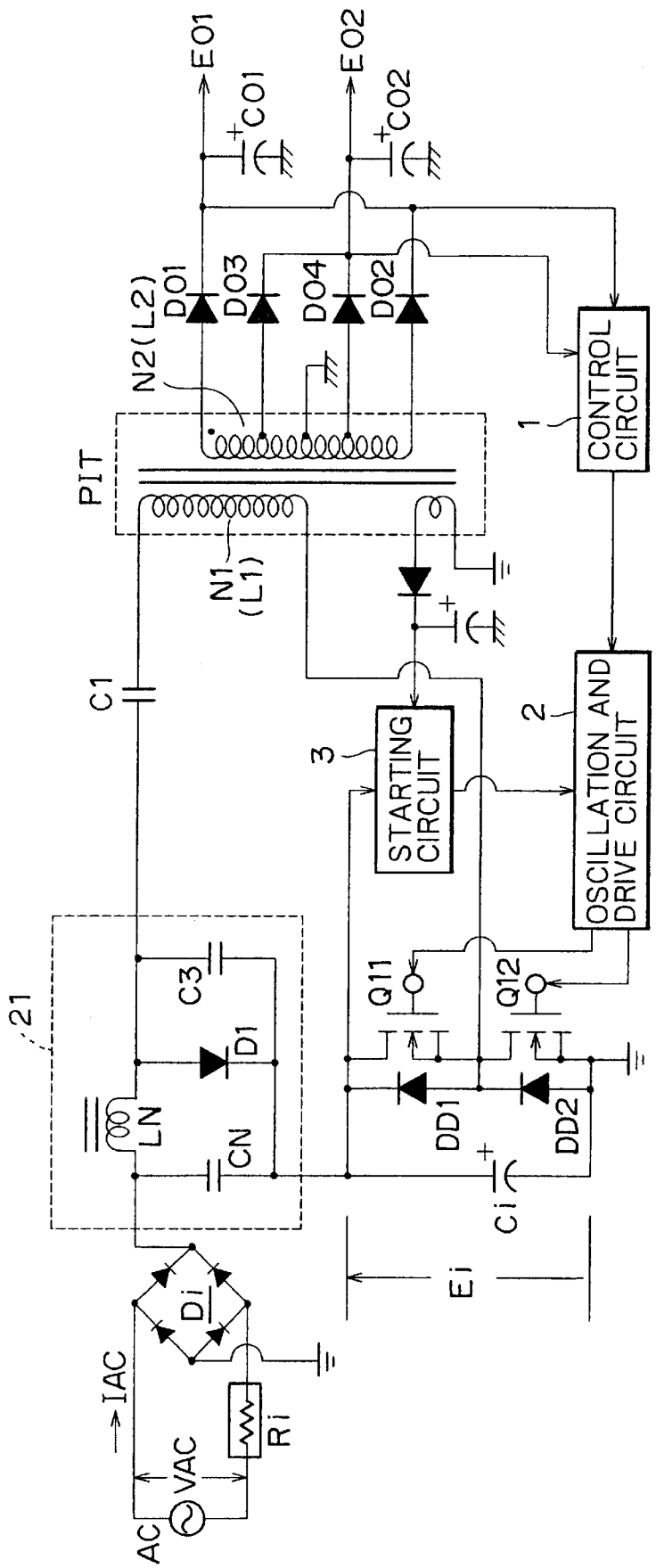
FIG. 11 is a circuit diagram showing a construction of another conventional power supply circuit.
Figure 12:
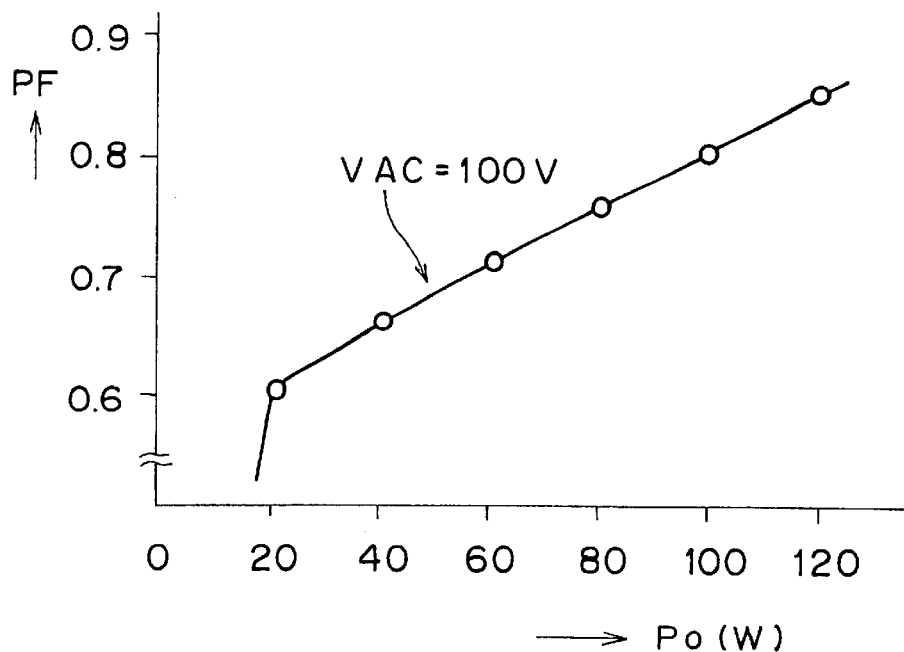
FIG. 12 is a characteristic diagram illustrating a relationship between a load power and a power factor of the power supply circuits of FIGS. 10 and 11.
Figure 13:
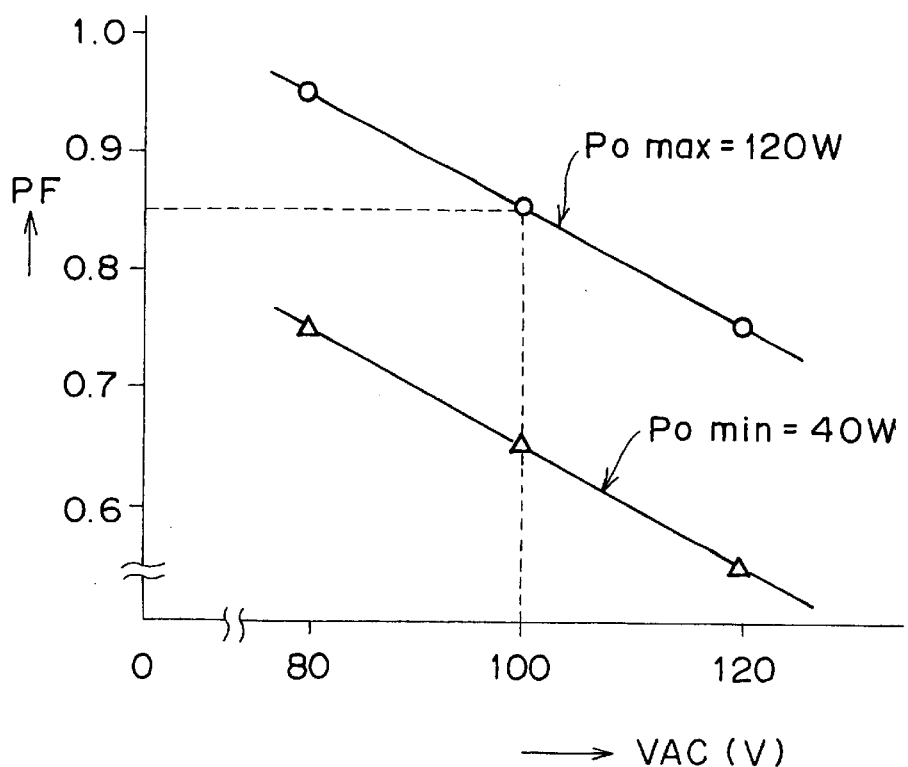
FIG. 13 is a characteristic diagram illustrating a relationship between an ac input voltage and a power factor of the power supply circuits of FIGS. 10 and 11.

FIG. 1 is a circuit diagram showing a construction of a switching power supply circuit as an embodiment of the present invention. It is to be noted that, in FIG. 1, like elements to those of FIG. 10 or 11 are denoted by like reference characters and description of them is omitted.

On the primary side of the power supply circuit shown in FIG. 1, a switching converter of the voltage resonance type (voltage resonance type converter) is provided. And, a power factor improvement circuit is provided for the voltage resonance type converter.

Thus, a construction of the power factor improvement circuit 10 is hereinafter described, and a construction of the voltage resonance type converter is described first.

The voltage resonance type converter here adopts a self-excited scheme which includes a single switching element Q1. In this instance, a high voltage withstanding bipolar transistor (BJT; junction transistor) is adopted for the switching element Q1.

The base of the switching element Q1 is connected to the positive electrode side of a smoothing capacitor Ci (rectified smoothed voltage Ei) through a starting resistor RS so that base current upon starting may be obtained from a rectification smoothing line. Further, a resonance circuit for self-excited oscillation driving (self-excited oscillation drive circuit) is connected between the base of the switching element Q1 and the primary side ground and is formed from a series connection circuit including a driving winding NB, a resonance capacitor CB, and a base current limiting resistor RB.

A clamp diode DD is interposed between the base of the switching element Q1 and the negative electrode (primary side ground) of the smoothing capacitor Ci and forms a path for clamp current which flows when the switching element Q1 is off.

The collector of the switching element Q1 is connected to the positive terminal of the smoothing capacitor Ci through a series connection of a detecting winding ND and a primary winding N1. The emitter of the switching element Q1 is grounded to the primary side ground.

A pair of capacitors Cr1 and Cr2 connected in series are connected as a parallel resonance capacitor between the collector and the emitter of the switching element Q1. The parallel resonance capacitor Cr (Cr1, Cr2) forms, based on a capacitance of the parallel resonance transistor Cr itself and a leakage inductance Ll of the primary winding N1 of an insulating converter transformer PIT which is hereinafter described, a primary side parallel resonance circuit of the voltage resonance type converter. Although detailed description is omitted here, when the switching element Q1 is off, an operation of the voltage resonance type is obtained by an action of the parallel resonance circuit which causes the voltage across the resonance capacitor Cr (Cr1, Cr2) to actually exhibit a pulse wave of a sine waveform.

An orthogonal control transformer PRT shown in FIG. 1 is a saturable reactor which includes the detection winding ND, the driving winding NB and a control winding NC wound thereon. The orthogonal control transformer PRT is provided to drive the switching element Q1 and perform constant voltage control.

The orthogonal control transformer PRT has such a structure that, though not shown, a three dimensional core is formed such that two double channel-shaped cores each having four magnetic legs are joined to each other at the ends of the magnetic legs thereof. The detection winding ND and the driving winding NB are wound in the same winding direction around two predetermined ones of the magnetic legs of the three dimensional core, and the control winding NC is wound in a direction orthogonal to that of the detection winding ND and the driving winding NB.

In this instance, the detection winding ND of the orthogonal control transformer PRT (frequency variation means) is connected in series to the primary winding N1 of the insulating converter transformer PIT which is hereinafter described so that the switching output of the switching element Q1 is transmitted to the detection winding ND through the primary winding N1.

In the orthogonal control transformer PRT, the driving winding NB is excited by a switching output obtained at the detection winding ND through a transformer coupling so that an alternating voltage as a drive voltage is generated in the driving winding NB. The drive voltage is outputted as drive current from the series resonance circuit (NB, CB), which forms a selfexcited oscillation drive circuit, to the base of the switching element Q1 through the base current limiting circuit RB. Consequently, the switching element Q1 performs a switching operation in a switching frequency determined by the resonance frequency of the series resonance circuit (NB, CB).

Figure 2:
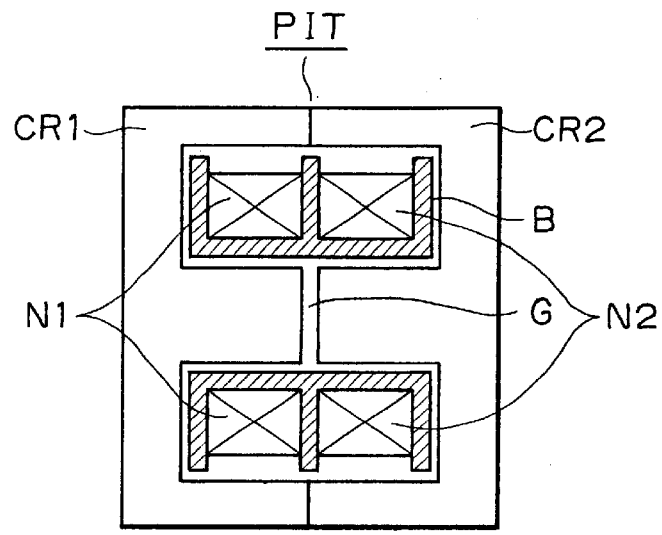
FIG. 2 is a side elevational sectional view showing a structure of an insulation converter transformer adopted by the power supply circuit of FIG. 1.

The insulating converter transformer PIT in the present embodiment includes, as shown in FIG. 2, an EE-shaped core formed from, for example, a pair of E-shaped cores CR1 and CR2 made of a ferrite material and combined such that magnetic poles thereof are opposed to each other. The primary winding N1 and the secondary winding N2 are wound in a separate condition from each other on the central magnetic legs of the EE-shaped core using a split bobbin B. A gap G is formed between the central magnetic legs of the EE-shaped core as shown in FIG. 2. Consequently, a loose coupling having a required coupling coefficient can be obtained.

The gap G can be formed by forming the central magnetic legs of the E-shaped cores CR1 and CR2 shorter than the other two outer magnetic legs. The coupling coefficient k in this instance is, for example, k≈0.85 which is a coupling coefficient of a loose coupling. Consequently, a saturation condition is less liable to be obtained as much.

An end of the primary winding N1 of the insulation converter transformer PIT is connected to the collector of the switching element Q1, and the other end of the primary winding N1 is connected to the positive electrode (rectified smoothed voltage Ei) of the smoothing capacitor Ci through a series connection of the detection winding ND.

On the secondary side of the insulation converter transformer PIT, an alternating voltage induced by the primary winding N1 appears in the secondary winding N2. In this instance, as a secondary side parallel resonance capacitor C2 is connected in parallel to the secondary winding N2, a parallel resonance circuit is formed from a leakage inductance L2 of the secondary winding N2 and a capacitance of the secondary side parallel resonance capacitor C2. The alternating voltage induced in the secondary winding N2 is converted into a resonance voltage by the parallel resonance circuit. In short, a voltage resonance operation is obtained on the secondary side.

Thus, in the power supply circuit, a parallel resonance circuit for making the switching operation a switching operation of the voltage resonance type is provided on the primary side, and a parallel resonance circuit for obtaining a voltage resonance operation is provided also on the secondary side. It is to be noted that, in the present specification, a switching converter of a construction which includes resonance circuits for both of the primary side and the secondary side in this manner is suitably referred to as "composite resonance type switching converter".

In this instance, in the parallel resonance circuit on the secondary side formed in such a manner as described above, taps are provided for the secondary winding N2, and rectification diodes D01, D02, D03 and D04 and smoothing capacitors C01 and C02 are connected in such a manner as shown in the figure to provide two sets of full-wave rectification circuits including a set of the [rectification diodes D01 and D02 and smoothing capacitor C01] and another set of the [rectification diodes D03 and D04 and smoothing capacitor C02]. The full-wave rectification circuit composed of the [rectification diodes D01 and D02 and smoothing capacitor C01] produces a dc output voltage E01, and the full-wave rectification circuit composed of the [rectification diodes D03 and D04 and smoothing capacitor C02] similarly produces a dc output voltage E02.

It is to be noted that, in this instance, the dc output voltage E01 and the dc output voltage E02 are branched and inputted also to a control circuit 1. The control circuit 1 utilizes the dc output voltage E01 as a detection voltage and utilizes the dc output voltage E02 as an operation power supply therefor.

The control circuit 1 supplies dc current, whose level varies, for example, in response to the level of the secondary side dc voltage output E01, as control current to the control winding NC of the drive transformer PRT to perform constant voltage control as hereinafter described.

In the insulating converter transformer PIT, the mutual inductance M between the inductance L1 of the primary winding N1 and the inductance L2 of the secondary winding N2 may have a value +M and another value −M depending upon the relationship between the polarities (winding directions) of the primary winding N1 and the secondary winding N2 and the connection of the rectification diodes D0 (D01, D02, D03, D04).

Figure 3A:
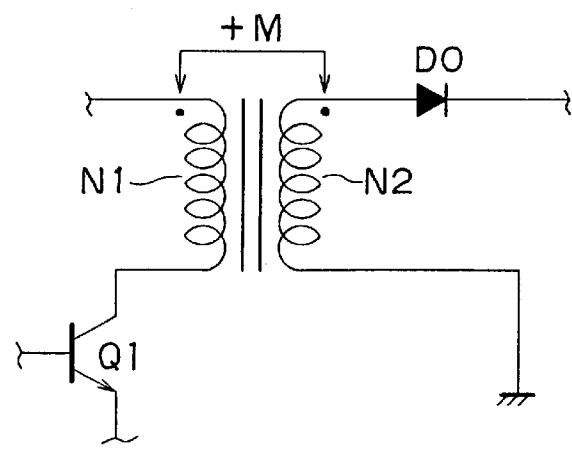
FIGS. 3A and 3B are circuit diagrams illustrating operations of the insulation converter transformer shown in FIG. 2 when the mutual inductance is +M and −M, respectively.
Figure 3B:
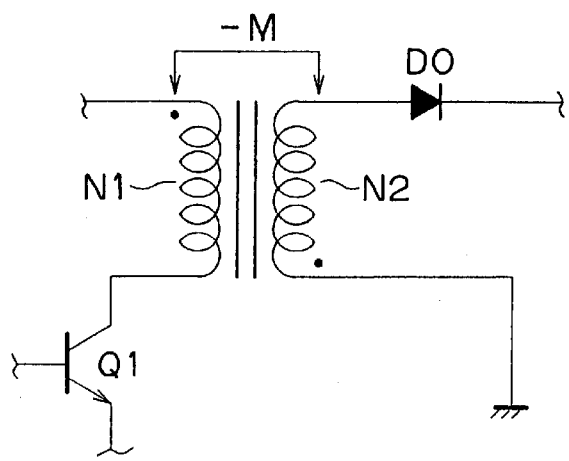

For example, if the components mentioned assume such a connection configuration as shown in FIG. 3A, then the mutual inductance M is +M (additive mode: forward system), but if the components assume such a connection configuration as shown in FIG. 3B, then the mutual inductance M is −M (subtractive mode: flyback system).

If this is examined in connection with operation of the secondary side of the power supply circuit shown in FIG. 1, for example, the operation that rectified current flows through the rectification diode D01 (D03) when the alternating voltage obtained at the secondary winding N2 has the positive polarity can be regarded as an operation mode of +M (forward mode). On the contrary, the operation that rectified current flows through the rectification diode D02 (D04) when the alternating voltage obtained at the secondary winding N2 has the negative polarity can be regarded as an operation mode of −M (flyback mode). In other words, the power supply circuit operates in the +M/−M mode of the mutual inductance each time the alternating voltage obtained at the secondary winding becomes positive/negative.

As the level of the control current (dc current) to be supplied to the control winding NC is varied in response to a variation of the secondary side dc output voltage level (E01) by the control circuit 1, the inductance LB of the driving winding NB wound on the orthogonal control transformer PRT is variably controlled. Consequently, the resonance condition of the series resonance circuit in the self-excited oscillation drive circuit for the switching element Q1 which is formed including the inductance LB of the driving winding NB varies. This is an operation of varying the switching frequency of the switching element Q1, and this operation acts to stabilize the secondary side dc output voltage.

In the circuit shown in FIG. 1, the switching frequency is to be varied, the period within which the switching element Q1 is on is variably controlled whereas the period within which the switching element Q1 is off is kept fixed. In short, it can be considered that the power supply apparatus operates, as a constant voltage controlling operation, to variably control the switching frequency to perform resonance impedance control for the switching output, and simultaneously performs continuity angle control (PWM control) of the switching element in a switching period. This composite control operation is realized with a single control circuit system.

Here, the switching frequency control is performed such that, for example, when the secondary side output voltage rises, for example, due to a tendency of a low load, the switching frequency is set higher to suppress the secondary side output.

Subsequently, a construction of the power factor improvement circuit 10 is described.

In the power factor improvement circuit 10 shown in FIG. 1, a filter choke coil LN—high speed recovery type diode D1—choke coil LS connected in series are inserted between a positive output terminal of a bridge rectification circuit Di and a positive terminal of the smoothing capacitor Ci.

A filter capacitor CN is interposed between the anode side of the high speed recovery type diode D1 and the positive terminal of the smoothing capacitor Ci to form a low-pass filter of a normal mode together with the filter choke coil LN.

In the power factor improvement circuit 10, the connection point between the capacitors Cr1 and Cr2 connected in series to form the parallel resonance capacitor described above is connected to a connection point between the cathode of the high speed recovery type diode D1 and the choke coil LS so that a switching output (voltage resonance pulse voltage) supplied to the primary side parallel resonance circuit may be fed back.

The power factor improvement operation of the power factor improvement circuit 10 basically is such as described below.

In the construction of the power factor improvement circuit 10 shown in FIG. 1, the switching output supplied to the primary side parallel resonance circuit is fed back to the rectified current path through an inductive reactance (magnetic coupling) which the choke coil LS itself has.

With the switching output fed back in such a manner as described above, an alternating voltage of the switching period is superposed on the rectified current path. By the superposed component of the alternating voltage of the switching period, an operation of interrupting the rectified current in the switching period is obtained at the high speed recovery type diode D1. By the interruption operation, however, also the apparent inductance of the filter choke coil LN and the choke coil LS increases. Consequently, charging current to the smoothing capacitor Ci flows also within a period within which the rectified output voltage level is lower than the voltage across the smoothing capacitor Ci.

As a result, an average waveform of the ac input current approaches the waveform of the ac input voltage to increase the continuity angle of the ac input current, and consequently, improvement of the power factor is achieved.

In the present example, the parallel resonance capacitor Cr which forms the primary side parallel resonance circuit of the voltage resonance converter of the primary side is formed from a series connection of the capacitors Cr1 and Cr2 as described hereinabove, and the connection point between the capacitors Cr1 and Cr2 is connected to the cathode of the high speed recovery type diode D1 of the power factor improvement circuit 10. Accordingly, a circuit system as a voltage feedback system is formed wherein the voltage resonance pulse voltage which appears as a voltage across the resonance capacitor Cr (Cr1 and Cr2) is divided at a ratio in electrostatic capacitance between the capacitors Cr1 and Cr2 and is fed back to the connection point between the high speed recovery type diode D1 and the choke coil LS.

The electrostatic capacitances of the capacitors Cr1 and Cr2 are set to Cr1 <Cr2, and particularly an increase of the electrostatic capacitance of the capacitor Cr2 augments the power factor PF.

In particular, within a period within which the ac input voltage VAC is high, the switching frequency fs is controlled to a high value, but within a period within which the ac input voltage VAC is low, the switching frequency fs is controlled to a low value. Consequently, in the proximity of a peak value of the ac input voltage VAC, the voltage resonance pulse voltage is not fed back to the power factor improvement circuit 10, and the ac input current IAC from the ac power supply AC is charged into the smoothing capacitor Ci through the bridge rectification circuit D1→filter choke coil LN→high speed recovery type diode D1→choke coil LS. Then, as the ac input voltage VAC becomes lower, the feedback amount of the voltage resonance pulse voltage to the power factor improvement circuit 10 increases.

From this, the ac input voltage VAC, ac input current IAC, divided voltage V2 by the capacitors Cr1 and Cr2, current ILS flowing through the choke coil LS, feedback current I2 and current ID1 flowing through the high speed recovery type diode D1 exhibit such operation waveforms as shown in FIGS. 4A to 4F.

Meanwhile, the divided voltage V2 by the capacitor Cr2, current ILS flowing through the choke coil LS, feedback current I2 and current ID1 flowing through the high speed recovery type diode D1 in a switching period at a point of time when the ac input voltage VAC illustrated in FIG. 4A becomes equal to 0 exhibit such operation waveforms as shown in FIGS. 5A to 5D, respectively.

It can be seen that, at this time, the operation waveforms of the current ILS flowing through the choke coil LS and the feedback current I2 fed back as a voltage become sine waves due to the series resonance of the capacitor Cr2 and the choke coil LS.

Using the switching power supply circuit of the present embodiment, an experiment was conducted under the conditions that the filter choke coil LN=100 $\mu$H, filter capacitor CN=1 $\mu$F, choke coil LS=68 $\mu$H, capacitor Cr1 =4,700 $\mu$F, and capacitor Cr2 =0.022 $\mu$F, the load range from the maximum load power Pomax=140 W to the minimum load power Pomin=0 W and the control range of the switching frequency fs=100 KHz to 200 KHz with respect to the variation of the ac input voltage VAC=80 V to 140 V.

Figure 6:
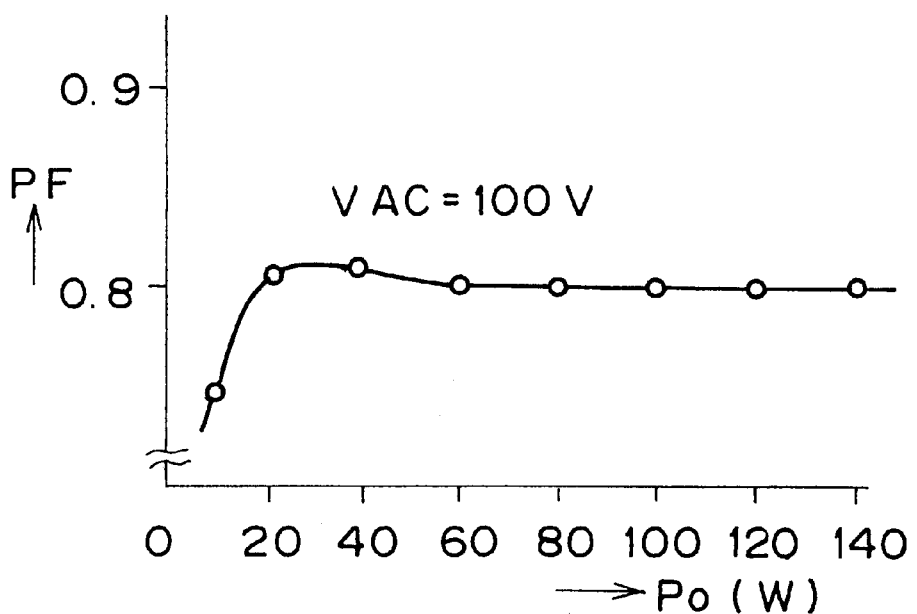
FIG. 6 is a characteristic diagram illustrating a relationship between a load power and a power factor of the switching power supply circuit of FIG. 1.

As a result, in the state of the ac input voltage VAC=100 V, the power factor PF is almost equal to 0.8 with respect to the load variation of the load power Po=140 W to 20 W as shown in FIG. 6, and is kept fixed.

Figure 7:
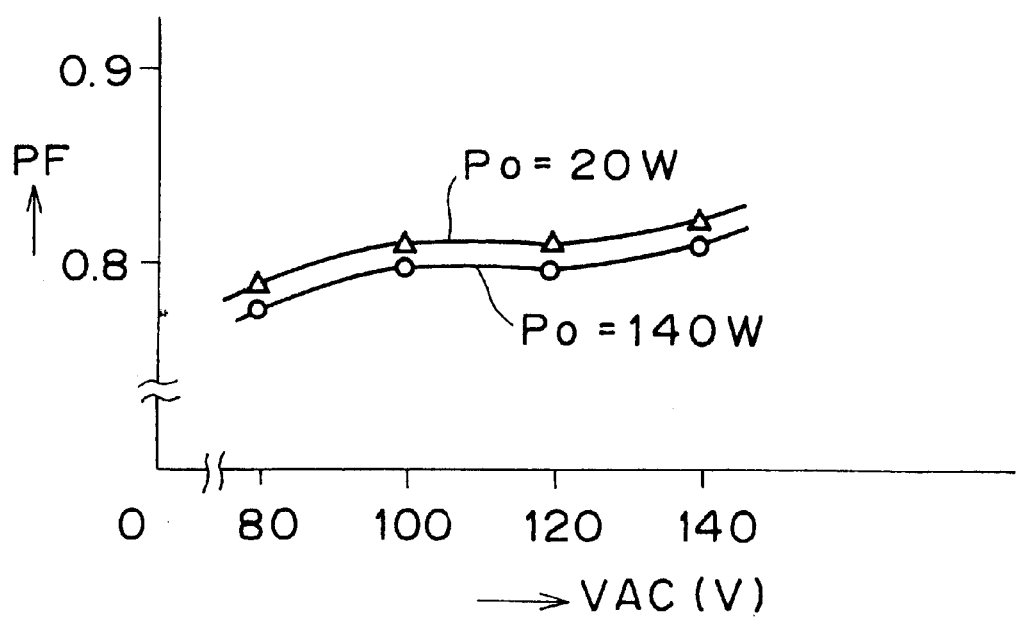
FIG. 7 is a characteristic diagram illustrating a relationship of an ac input voltage and a power factor of the switching power supply circuit of FIG. 1.

Further, under the condition of the load power Po=140 W to 20 W with respect to a variation within the range of the ac input voltage VAC=80 V to 140 V, substantially similar power factors were obtained as seen in FIG. 7.

Also the 50 Hz ripple voltage component of the secondary side dc output voltage level E01 exhibits an increase of approximately two times that where the power factor improvement circuit 10 is not provided, and this is within a range within which there is no problem in actual use if the switching power supply circuit is used as a power supply circuit for use with, for example, a color television or the like.

In this manner, the power supply circuit of the present embodiment can maintain a high power factor irrespective of a variation of the ac input voltage or the load. Consequently, it is sufficiently possible in practical use to incorporate the power supply circuit of the present embodiment not only in a television receiver or the like with which ac input voltage and load conditions are designated but also, for example, in business apparatus with which a load condition varies and business apparatus such as a personal computer.

Subsequently, a second embodiment of the present invention is described with reference to FIG. 8.

Figure 8:
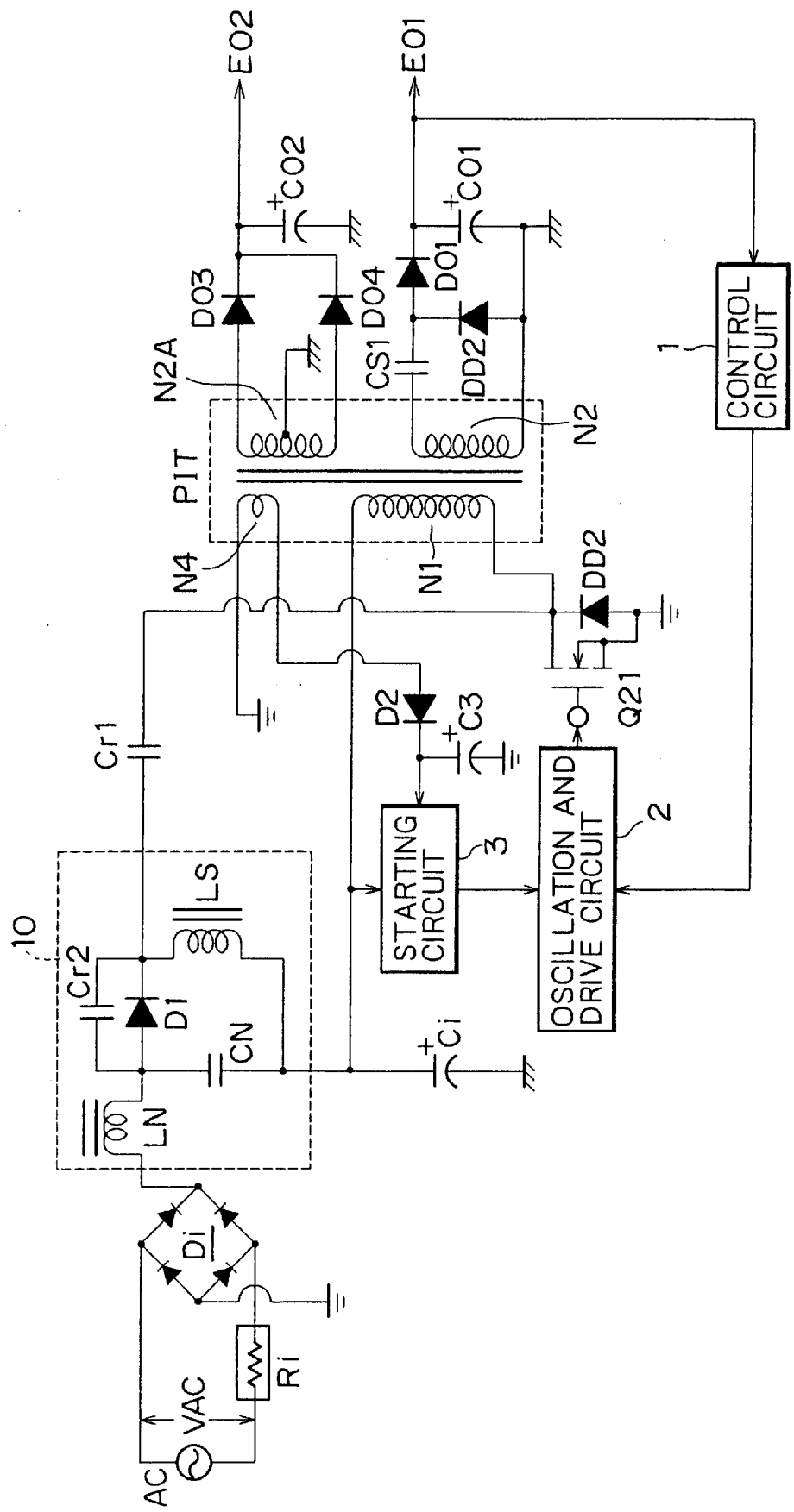
FIG. 8 is a circuit diagram showing a construction of a switching power supply circuit according to a second embodiment of the present invention.

FIG. 8 is a circuit diagram showing a construction of a power supply circuit according to the second embodiment of the present invention. It is to be noted that, in FIG. 8, like elements to those of FIGS. 1, 10 and 11 are denoted by like reference characters and description thereof is omitted.

Further, an insulation converter transformer PIT shown in FIG. 8 has a structure similar to that shown in FIG. 11.

Referring to FIG. 8, a voltage resonance converter provided on the primary side has a separate excitation scheme and includes a switching element Q21 formed from, for example, a MOS-FET. The drain of the switching element Q21 is connected to the positive electrode of a smoothing capacitor Ci through a primary winding N1, and the source of the switching element Q21 is connected to the primary side ground.

Also in this instance, a parallel resonance capacitor Cr is formed from a series connection of capacitors Cr1 and Cr2. An end of the capacitor Cr1 is connected to the drain of the switching element Q21, and the other end of the capacitor Cr1 is connected to a connection point between a high speed recovery type diode D1 and a choke coil LS of the power factor improvement circuit 10.

Further, the capacitor Cr2 is connected in parallel to the high speed recovery type diode D1.

A clamp diode DD is connected between the drain and the source of the switching element Q21.

The switching element Q21 is driven to switch by an oscillation drive circuit 2 so that such a switching operation as described hereinabove with reference to FIG. 1 may be obtained.

In particular, the control circuit 1 supplies current or voltage of the level which has varied in response to a variation of the secondary side dc output voltage E01 to the oscillation drive circuit 2. The oscillation drive circuit 2 outputs a switching drive signal (voltage) whose period has been varied in response to the output level from the control circuit 1 to the gate of the switching element Q21 so that the secondary side dc output voltage E01 may be stabilized. The switching frequency of the switching element Q21 is thus varied in response the switching drive signal. Thereupon, a switching drive signal produced so that the period within which the switching element Q21 is on is varied whereas the period within which the switching element Q21 is off is fixed as described above is outputted.

In this instance, the rectified smoothed voltage Ei obtained at the smoothing capacitor Ci is supplied as an operation power supply to a starting circuit 3, and the starting circuit 3 performs an operation for activating the oscillation drive circuit 2 with a voltage upon starting obtained at a winding N4 wound additionally on the insulation converter transformer PIT.

The power factor improvement circuit 10 shown in FIG. 8 is similar to the power factor improvement circuit 10 described hereinabove with reference to FIG. 1 except that the capacitor Cr2 described above is connected in parallel to the high speed recovery type diode D1.

Also with such a construction as described above, similarly as in the embodiment of FIG. 1, the parallel resonance capacitor Cr which forms the primary side parallel resonance circuit of the voltage resonance converter on the primary side is formed from a series connection of the capacitors Cr1 and Cr2, and the connection point between the capacitors Cr1 and Cr2 is connected to the cathode of the high speed recovery type diode D1 of the power factor improvement circuit 10. Accordingly, a circuit system as a voltage feedback system is formed wherein a voltage resonance pulse voltage which appears as a voltage across the parallel resonance capacitor Cr (Cr1 and Cr2) is divided at a ratio in electrostatic capacitance between the capacitors Cr1 and Cr2 and is fed back to the connection point between the high speed recovery type diode D1 and the choke coil LS. The electrostatic capacitances of the capacitors Cr1 and Cr2 are set to Cr1 <Cr2.

Consequently, similarly to the embodiment described with reference to FIG. 1, a high power factor can be maintained against a variation of the ac input voltage or the load. Consequently, it is sufficiently possible in practical use to incorporate the power supply circuit of the present embodiment not only in a television receiver or the like with which ac input voltage and load conditions are designated but also, for example, in business apparatus with which a load condition varies and business apparatus such as a personal computer.

By the way, on the secondary side of the power supply circuit shown in FIG. 8, an end of a secondary winding N2 is connected to the secondary side ground, and the other end of the secondary winding N2 is connected to the connection point between the anode of a rectification diode D01 and the cathode of a rectification diode D02 through a series connection of a series resonance capacitor Cs1. The cathode of the rectification diode D01 is connected to the positive electrode of a smoothing capacitor C01, and the anode of the rectification diode D01 is connected to the secondary side ground. The negative electrode side of the smoothing capacitor C01 is connected to the secondary side ground.

According to such a connection scheme as described above, a double voltage full-wave rectification circuit formed from a set of the [series resonance capacitor Cs1, rectification diodes D01 and D02, and smoothing capacitor C01]. Here, the series resonance capacitor Cs1 forms a series resonance circuit corresponding to on/off operations of the rectification diodes D01 and D02 based on a capacitance of the series resonance capacitor Cs1 itself and a leakage inductance component of the secondary winding N2.

In other words, the power supply circuit of the present embodiment has a scheme of a composite resonance switching converter wherein a parallel resonance circuit for making the switching operation an operation of the voltage resonance type is provided on the primary side and a series resonance circuit for obtaining a double voltage full-wave rectification operation is provided on the secondary side.

Here, the double voltage full-wave rectification operation by the set of the [series resonance capacitor Cs1, rectification diodes D01 and D02, and smoothing capacitor C01] described above is such as described below.

When a switching output is obtained at the primary winding N1 by a switching operation on the primary side, the switching output is excited in the secondary winding N2.

Then, within a period within which the rectification diode D01 is off and the rectification diode D02 is on, the primary winding N1 and the secondary winding N2 operate in a subtractive mode wherein the polarities of them (the mutual inductance M) become −M, and an operation of charging the series resonance capacitor Cs1 with the rectified current IC2 rectified by the rectification diode D02 is obtained by a series resonance action by the leakage inductance of the secondary winding N2 and the series resonance capacitor Cs1.

Within another period within which a rectification operation is performed with the rectification diode D02 turned off and with the rectification diode D01 turned on, the primary winding N1 and the secondary winding N2 operate in an additive mode wherein the polarities of them (the mutual inductance M) become +M, and an operation of charging the smoothing capacitor C01 in a state wherein series resonance wherein the potential of the series resonance capacitor Cs1 is added to the voltage induced in the secondary winding N2 occurs is performed.

Since a rectification operation is performed utilizing the two modes of the additive mode (+M: forward operation) and the subtractive mode (−M: flyback operation) as described above, a dc output voltage E01 equal to substantially twice the induced voltage of the secondary winding N2 is obtained at the smoothing capacitor C01.

According to the construction described above, on the secondary side of the circuit shown in FIG. 8, a secondary side dc output voltage is obtained by performing double voltage full-wave rectification utilizing a condition that the two operation modes wherein the mutual inductance is +M and −M are available. In particular, electromagnetic energy obtained by a current resonance action of the primary side and a current resonance action of the secondary side is supplied simultaneously to the load side. Consequently, also the power to be supplied to the load side further increases, and accordingly, significant increase of the maximum load power is achieved.

Further, since a secondary side dc output voltage is obtained by the double voltage full-wave rectification circuit, if it is intended to obtain a level equal to a secondary side dc output voltage obtained, for example, by an equal voltage rectification circuit, then the secondary winding N2 in the present embodiment may have a number of turns equal to one half a conventional one. The reduction in number of turns results in reduction of the size and the weight and reduction of the cost of the insulation converter transformer PIT.

It is to be noted that, in this instance, a secondary winding N2A is wound independently of the oscillation drive circuit 2 and a center tap of the secondary winding N2A is grounded and besides a full wave rectification circuit formed from rectification diodes D03 and D04 and a smoothing capacitor C02 is connected so as to produce a dc output voltage E02.

Subsequently, a third embodiment of the present invention is described with reference to FIG. 9.

Figure 9:
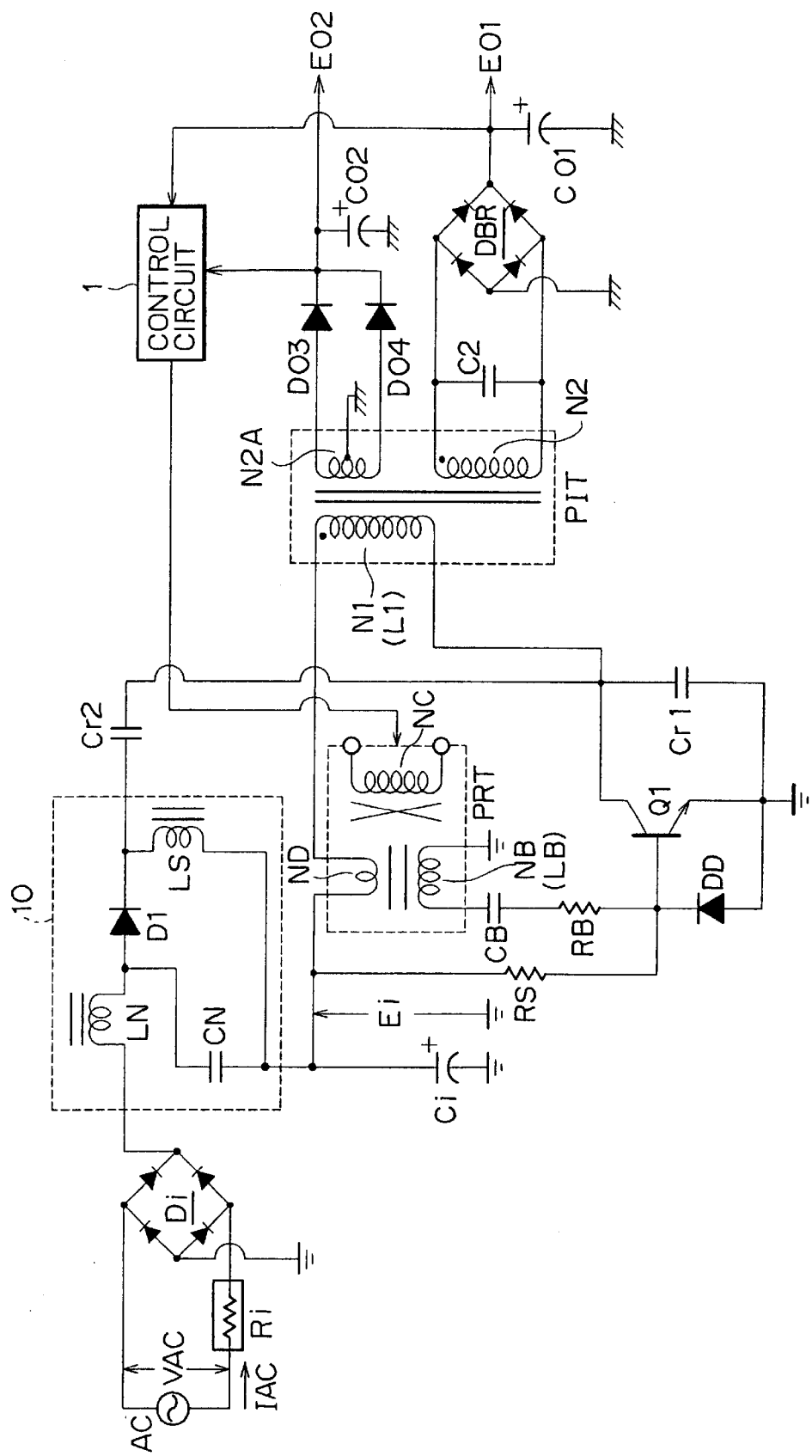
FIG. 9 is a circuit diagram showing a construction of a switching power supply circuit according to a third embodiment of the present invention.

The switching power supply circuit of FIG. 9 has a switching converter of the voltage resonance type (voltage resonance converter) provided on the primary side thereof basically similarly as in FIG. 1. A power factor improvement circuit is provided for the voltage resonance converter.

A parallel resonance capacitor Cr which forms a primary side parallel resonance circuit of a voltage resonance converter of the primary side is formed from a serial connection of a pair of capacitors Cr1 and Cr2. However, the parallel resonance capacitor Cr is different from that of the embodiment of FIG. 1 in that only the capacitor Cr1 is connected in parallel between the collector and the emitter of a switching element Q1 and the other end of the capacitor Cr2 is connected to the cathode of a high speed recovery type diode D1 of the power factor improvement circuit 10.

In this instance, the electrostatic capacitances of the capacitors Cr1 and Cr2 are selected such that that of the capacitor Cr1 is sufficiently higher than that of the capacitor Cr2. In other words, the capacitor Cr2 side is a smaller capacitance capacitor.

Also according to the present construction, a circuit system as a voltage feedback system is formed wherein a voltage resonance pulse voltage is divided at a ratio in electrostatic capacitance between the capacitors Cr1 and Cr2 and is fed back to a connection point between the high speed recovery type diode D1 and a choke coil LS. Consequently, similarly to the example described hereinabove with reference to FIG. 1, a high power factor can be maintained against a variation of the ac input voltage or the load.

Further, in this instance, a 50 Hz ripple voltage component of the secondary side dc output voltage E01 is equivalent to that where the power factor improvement circuit 10 is not provided, and this does not make a problem at all in actual use.

By the way, on the secondary side of the power supply circuit of FIG. 9, a secondary side parallel resonance capacitor C2 is provided for the secondary winding N2 to form a secondary side parallel resonance circuit while a rectification smoothing circuit formed from a bridge rectification circuit DBR and a smoothing capacitor C01 is provided for the secondary winding N2 to obtain the secondary side dc output voltage E01. In short, according the present construction, a full-wave rectification operation is obtained by the bridge rectification circuit DBR on the secondary side.

It is to be noted that, in this instance, on the secondary side, another secondary winding N2A is wound independently of the secondary winding N2 and a center tap is provided for the secondary winding 2A and besides rectification diodes D03 and D04 and a smoothing capacitor C02 are connected in such a manner as seen in FIG. 9 so as to obtain a secondary side dc output voltage E02 by a full-wave rectification operation. However, a parallel resonance capacitor is not provided for the secondary winding 2A.

While the embodiments are described above, the present invention can be carried out in further various forms.

For example, the applicant of the present application has already proposed also a construction of a composite resonance switching converter which includes a quadruple voltage rectification circuit which makes use of a secondary side series resonance circuit, and also such a construction as just described is possible as a modification to the present embodiment. In short, the present embodiment is not particularly limited in terms of the constructions of the resonance circuit and the rectification circuit on the secondary side.

Further, while the voltage resonance converter on the primary side in the embodiments described above has a construction of the so-called single end type which includes a single switching element, the present invention can be applied also to a voltage resonance converter of the so-called push-pull type wherein a pair of switching elements perform switching operations alternately.

While preferred embodiments of the present invention have been described using specific terms, such description is for illustrative purposes only, and it is to be understood that changes and variations may be made without departing from the spirit or scope of the following claims.

What is claimed is:

1. A switching power supply circuit, comprising:
   rectification smoothing means for receiving a commercial ac power supply to produce a rectified smoothed voltage and outputting the rectified smoothed voltage as a dc input voltage;

an insulation converter transformer having a gap formed therein so that a coupling coefficient of a loose coupling may be obtained and provided for transmitting a primary side output to a secondary side;

switching means for interrupting the dc input voltage by means of a switching element and outputting the interrupted dc voltage to a primary winding of said insulation converter transformer;

a primary side resonance circuit formed from a leakage inductance component at least including said primary winding of said insulation converter transformer and a capacitance of a primary side resonance capacitor for making operation said switching means operation of the voltage resonance type;

power factor improvement means inserted in a rectified current path for interrupting the rectified current based on a switching output of said switching means fed back to said power factor improvement means to improve the power factor;

a secondary side resonance circuit formed on the secondary side from a leakage impedance component of a secondary winding of said insulation converter transformer and a capacitance of a secondary side resonance capacitor;

dc output voltage production means formed including said secondary side resonance circuit for receiving an alternating voltage obtained at said secondary winding of said insulation converter transformer and rectifying the alternating voltage to produce a secondary side dc output voltage; and constant voltage control means for controlling the secondary side dc output voltage to a constant voltage in response to a level of the secondary side dc output voltage;

said primary side resonance capacitor being formed from a series connection of first and second capacitors;

the switching output of said switching means being fed back to said power factor improvement means through a connection point between said first and second capacitors.

2. A switching power supply circuit according to claim 1, wherein said power factor improvement means includes a high speed recovery type diode for interrupting the rectified current, and the connection point between said first and second capacitors and the cathode of said high speed recovery type diode are connected to each other.

3. A switching power supply circuit according to claim 1, wherein said power factor improvement means includes a high speed recovery type diode for interrupting the rectified current, and a grounded side one of said first and second capacitors is connected in parallel to said high speed recovery type diode.

4. A switching power supply circuit according to claim 1, wherein said power factor improvement means includes a high speed recovery type diode for interrupting the rectified current, and a smaller capacitance one of said first and second capacitors is connected to the cathode of said high speed recovery type diode.

* * * * *